Sept. 24, 1957 W. WAITE ET AL 2,807,563
INSULATED PIPE COVERING
Filed July 5, 1952
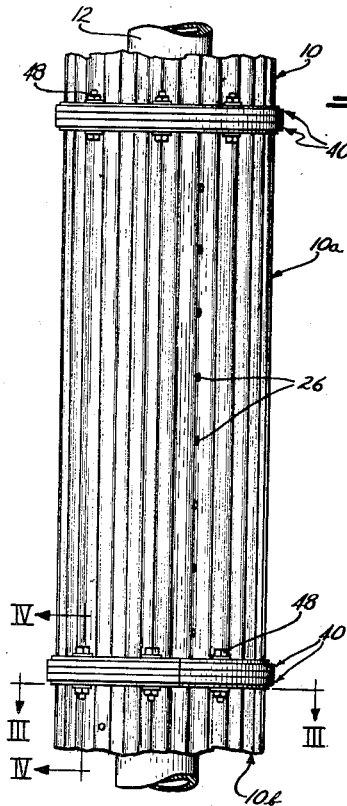
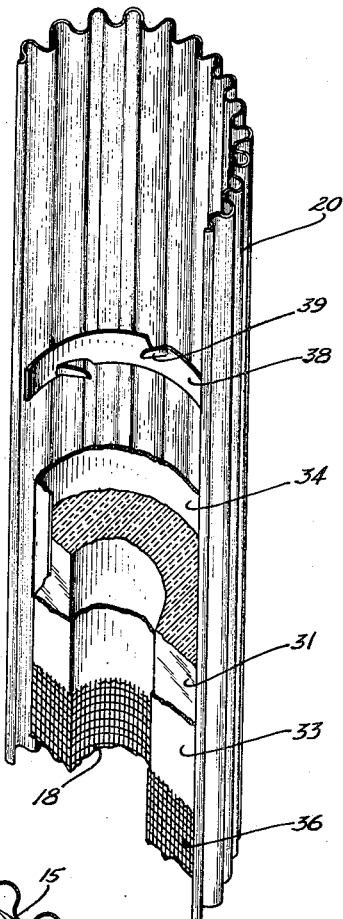
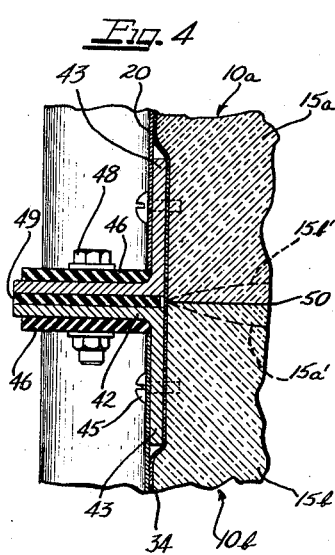
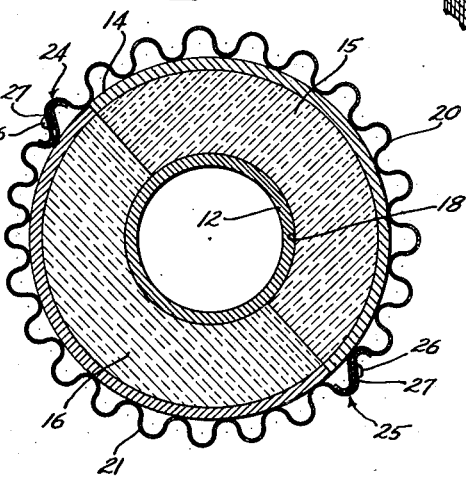
INVENTORS
WILLIAM WAITE
DONALD D. GRASSICK
Francis W. Anderson ATTY.

United States Patent Office 2,807,563
Patented Sept. 24, 1957

2,807,563

INSULATED PIPE COVERING

William Waite, Elmhurst, and Donald D. Grassick, Clarendon Hills, Ill.

Application July 5, 1952, Serial No. 297,266

4 Claims. (Cl. 154—44)

This invention relates to improvements in insulated pipe coverings. More particularly it has to do with an improved pipe covering which features a novel self-supporting, vapor-tight construction.

The efficient insulation of outdoor pipe systems presents several structural and operational problems. Any insulating covering that is applied to the stand pipe of a water tower, for example, must provide efficient insulation to prevent freezing of the water during off-load periods in winter weather. Also, during warm weather, when the water temperature is lower than the air temperature and when high humidities are prevalent, there is a vapor pressure movement inwardly through the covering toward the colder pipe surface. The covering must provide a positive barrier to this vapor movement so that the vapor will not have a chance to condense on the pipe surfaces and saturate the insulation, causing a loss in thermal efficiency and possibly disintegration of the covering. The covering should, therefore, be water and vapor tight so that the insulation mass remains dry and efficient at all times.

It is therefore an important object of the present invention to provide an insulating pipe covering that is constructed and arranged to prevent passage of water or vapor into the interior of the covering.

Another object of this invention is the provision of a sectional pipe covering in which the sections may be secured together to form a unitary self-supporting covering, each section having sufficient structural strength to support the sections above it.

A further object of this invention is the provision of sealing means for connecting two corrugated casing sections together in vapor-tight engagement.

According to the general features of the present invention there is provided a casing for a vertical standpipe, said casing being made up of a plurality of separate units mounted one on top of the other. Each unit consists of a cylindrical core of insulating material provided with a central longitudinal opening in which the standpipe is positioned. An outer covering of corrugated aluminum, formed in two semi-cylindrical sections, is secured around the insulating core. A circular collar is mounted on each unit at the end of the corrugated casing. Each collar is made up of two semi-circular elements of angular cross section, having a first leg extending radially outwardly in a direction transverse to the axis of the pipe and providing a mounting flange and a second leg at right angles to the first leg and lying inside the end of the outer corrugated casing for securement to the casing. A gasket of rubber-impregnated material is secured between the end surface of the corrugated outer covering and the face of the mounting flange, forming a vapor-tight joint. A similar gasket is disposed in the longitudinal joint between the overlapping longitudinal edges of the semi-cylindrical outer casing. When one unit is secured on top of a lower unit, another gasket is placed between the abutting collars thus forming a completely sealed vapor-tight insulating pipe covering.

The use of a corrugated casing to provide columnar strength for an insulating covering that is normally structurally weak is an important feature of this invention.

Other and further features, objects and advantages of the present invention will be apparent to one skilled in the art from the following detailed description taken in connection with the accompanying drawings.

On the drawings:

Figure 1 is a fragmentary elevational view of a pipe covering, constructed in accordance with the present invention, mounted around the standpipe of a water tower.

Figure 2 is a perspective view, with parts broken away, of a portion of the pipe covering of this invention.

Figure 3 is a sectional view taken on line 3—3 of Figure 1, with the insulating core of the pipe covering being illustrated more or less schematically.

Figure 4 is a vertical sectional view taken on line 4—4 of Figure 1, with the core illustrated schematically.

Figure 5 is a perspective view of a collar segment used in the pipe covering of this invention.

As shown on the drawings:

In Figure 1, reference numerals 10, 10a, and 10b indicate separate sections of a pipe covering mounted around a standpipe 12 of a water tower (not shown).

Each section consists of a cylindrical core of insulating material, formed of two semi-cylindrical portions 15 and 16 (Fig. 3) and providing a central, longitudinal passage 18 through which the pipe 12 extends. Two external cover members 20 and 21 are wrapped around the insulating core 14, each member extending slightly more than halfway around the core. Each cover member is made of aluminum sheet and has a corrugated configuration, the corrugations extending longitudinally of the pipe. As seen in Figure 3, the longitudinal joints 24 and 25, between the corrugated cover members 20 and 21, are formed by the overlapping longitudinal marginal portions of the members which are secured together by a plurality of aluminum or cadmium plated screw fasteners 26. To seal each longitudinal joint, a gasket 27 of rubber-impregnated material is locked between the overlapping edges by the screw fasteners 26.

In a preferred embodiment, each of the semi-cylindrical insulating core members 15 and 16 may comprise a body portion 31 (Fig. 2) of resin bound fibreglass molded to contour and protected along its entire inner and outer surfaces with jackets, 33 and 34, of water and vapor tight aluminum foil. A wire mesh liner 36 is disposed inside the inner foil jacket 33 to define the passage 18 through which the pipe 12 extends. To anchor each insulating core to the adjacent corrugated casing member, a plurality of aluminum straps 38 are secured, as by welding, in spaced relation along the inner face of each casing member. Each strap has several inturned tabs 39 that are of substantially wedge shape with pointed ends adapted to engage the core and hold it in position.

As seen in Figure 1, each pipe covering section is provided at each end with a circular mounting collar 40 by which two adjoining sections may be secured together. The collar 40 is made up of two semi-circular cooperating members 41, one of which is illustrated in Figure 5. These members have an angle shaped cross-section with one leg 42 extending radially outwardly in a direction transverse to the axis of the pipe and a second leg 43 at right angles to leg 42 and lying inside the end of the casing members 21 or 20, as seen in Figure 4. The leg 43 is secured to the casing by a plurality of bolts 45.

An annular gasket 46 of rubber impregnated material is disposed between the underside of the collar leg 42 and the serpentine end face of the corrugated casing to seal the joint between the collar and the casing. This gasket also seals the bolt holes 47, Figure 5, through which bolts 48, Figure 4, extend for securing the sections together. A similar circular gasket 49 is disposed between the abutting faces of the legs 42 to seal the joint between the adjacent collars. It will be understood that the middle gasket 49 and the two flange gaskets 46 are provided with suitable holes through which the bolts extend.

Referring to Figure 4, the reference numeral 15a indicates the insulating core of an upper covering section 10a and the numeral 15b indicates the insulating core of a lower adjoining covering section 10b. At the abutting surface of the two insulating cores, the core 15a is bulged downwardly as indicated by the dotted line 15a' while the core 15b is bulged upwardly as at 15b'. With this arrangement, a self-gasketing abutting contact, as at 50, will be formed when the sections 10a and 10b are bolted together.

While it will be evident that the pipe covering of this invention will have definite advantageous insulating characteristics, the specific arrangement of the various members of the covering to obtain an increased insulating value is a feature of this invention. Referring to Figure 2, it is to be noted that each outer cover member is made of polished aluminum which has high insulating characteristics due to its reflective surfaces. Further, sealed air spaces are formed between the inner wall surface of the corrugated cover and the aluminum foil jacket 34 with the reflective surfaces of the cover and of the foil jacket facing the air spaces. Further in, the inner aluminum foil jacket 33 has an inner reflective surface facing the relatively cold surface of the pipe 12.

From the foregoing description it will be seen that there is provided in this invention a novel pipe covering that is constructed to provide columnar strength, has an efficient novel arrangement of insulating members, and is completely sealed at all joints against the penetration of vapor or water through the covering.

It will be understood that modifications and variations may be effected without departing from the scope of the novel concepts of the present invention.

We claim as our invention:

1. A pipe covering unit comprising a core of insulating material having a longitudinal opening therethrough arranged to receive the pipe, a casing of sheet material enclosing said core and having a corrugated configuration, a mounting member secured to each end of said casing, a flange on each of said members extending laterally of said casing and having a surface in confronting relation to the adjacent serpentine end surface of the corrugated casing, and a gasket of deformable material disposed in compressed sealing engagement between each flange and the adjacent serpentine end surface of said casing.

2. A pipe covering unit comprising an elongated core of insulating material having a longitudinal opening therethrough arranged to receive the pipe, a casing of sheet material enclosing said core and having a corrugated configuration with the corrugations extending longitudinally of said casing, said casing having overlapping edges defining a longitudinal seam, first sealing means for sealing said longitudinal seam, a mounting member secured to each end of said casing, each mounting member having a flat annular flange extending laterally of said casing in confronting relation with the serpentine end face of said casing, and a cylindrical flange extending longitudinally of the casing between the end portion of the casing and said insulating core, means for securing said cylindrical flange to said casing end portion, and second sealing means disposed between said flange and said serpentine end face, sealing the joint formed thereby.

3. An insulating cover for a vertical pipe comprising a plurality of elongated units containing insulating material and mounted one on top of another in a stacked vertical position around the pipe, each unit comprising a cylindrical core of insulating material disposed around the pipe, a casing of relatively thin, non-rigid sheet metal adapted to be folded transversely to enclose said core, a rigid flange having a first portion secured to an end portion of the casing to hold said casing in cylindrical form and a second portion extending laterally thereof in confronting relation to the adjacent end surface of said casing, the flanges of adjacent units being arranged to be secured to each other, a sealing gasket disposed between each flange and the adjacent end surface of said casing, and a sealing gasket between adjacent flanges.

4. An insulating cover for a vertical pipe comprising a plurality of elongated units mounted one on top of another in stacked vertical position around the pipe, each unit having a cylindrical casing comprising a pair of thin corrugated sheet metal plates foldable about a longitudinal axis into semi-cylindrical form, a rigid semi-cylindrical collar secured to each end of each foldable plate to hold the plate in a semi-cylindrical configuration, means for securing the longitudinal marginal edges of one plate to the marginal edges of the other plate to enclose said pipe, each of said collars having a flange extending laterally of the pipe into abutting face-to-face contact with a flange on an adjacent unit, means for securing abutting flanges together, and a sealing gasket disposed between each serpentine end surface of said thin sheet metal plate and the connected laterally extending angle flange.

References Cited in the file of this patent

UNITED STATES PATENTS

| | | |
|---|---|---|
| 775,541 | McConnell | Nov. 22, 1904 |
| 1,111,688 | Bonitz | Sept. 22, 1914 |
| 1,440,978 | Feigen | Jan. 2, 1923 |
| 1,734,209 | Huffine | Nov. 5, 1929 |
| 2,078,606 | LeGrand | Apr. 27, 1937 |
| 2,129,865 | Newport et al. | Sept. 13, 1938 |
| 2,238,022 | Johnson | Apr. 8, 1941 |
| 2,330,966 | Gottwald et al. | Oct. 5, 1943 |
| 2,379,990 | Rembert | July 10, 1945 |
| 2,532,587 | Williamson | Dec. 5, 1950 |
| 2,602,764 | Billingham | July 8, 1952 |

FOREIGN PATENTS

| | | |
|---|---|---|
| 3,443 | Great Britain | A. D. 1900 |